United States Patent
Cryan

(10) Patent No.: US 6,212,318 B1
(45) Date of Patent: Apr. 3, 2001

(54) ADD/DROP FILTERS AND MULTIPLEXERS FABRICATED FROM CLADDING MODE COUPLERS AND FIBER BRAGG GRATINGS

(75) Inventor: Colm V. Cryan, Arlington, MA (US)

(73) Assignee: Thomas & Betts International, Inc., Sparks, NV (US)

( * ) Notice: Subject to any disclaimer, the term of this patent is extended or adjusted under 35 U.S.C. 154(b) by 0 days.

(21) Appl. No.: 09/421,173

(22) Filed: Oct. 19, 1999

Related U.S. Application Data

(60) Provisional application No. 60/105,243, filed on Oct. 22, 1998.

(51) Int. Cl.[7] .................................................. G02B 6/34
(52) U.S. Cl. ................................ 385/37; 385/24; 385/43; 385/47
(58) Field of Search ............................... 385/37, 24, 42, 385/43, 47, 48; 359/124, 127

(56) References Cited

U.S. PATENT DOCUMENTS 5,703,976 * 12/1997 Cullen ..................................... 385/24
5,717,798 * 2/1998 Strasser et al. ........................ 385/37

* cited by examiner

*Primary Examiner*—Darren Schuberg
*Assistant Examiner*—Tayez Assai
(74) *Attorney, Agent, or Firm*—Hoffman & Baron, LLP

(57) ABSTRACT

An optical fiber add/drop filter includes a first and second elongate photosensitive optical fiber, each optical fiber having opposed first and second ends and including a core and a cladding. The cladding of the first optical fiber is optically coupled to the cladding of the second optical fiber at a coupler. A first fiber Bragg grating is etched into a second end of the first fiber for converting light propagating in a first direction through either of the core of cladding of the first fiber into light propagating in an opposite direction through the other of said core and cladding of said second fiber. A second fiber Bragg grating is etched into a first end of the second fiber for converting light propagating in a first direction either of the core or cladding of the second fiber into light propagating in an opposite direction through the other of the core and cladding of the second fiber. The first and second fiber Bragg gratings are located to opposite sides of the coupler. The add/drop filter of the present invention may be cascaded to form an optical add/drop multiplexer.

19 Claims, 2 Drawing Sheets

ADD/DROP FILTERS AND MULTIPLEXERS FABRICATED FROM CLADDING MODE COUPLERS AND FIBER BRAGG GRATINGS

This application claims the benefit of U.S. Provisional Application No. 60/105,243 filed on Oct. 22, 1998.

FIELD OF THE INVENTION

The present invention relates to the field of fiber optic components. More particlarly, the present invention relates to wavelength division multiplexing using add/drop filters and multiplexers fabricated from cladding mode couplers and fiber Bragg gratings.

BACKGROUND OF THE INVENTION

Wavelength-division multiplexer are employed in optical fiber systems in which light waves of a particular spectrum or channel may be either multiplexed, i.e. added to, or demultiplexed, i.e. extracted from, a given transmission traveling in a core mode of a fiber optic cable. A channel extracted from a fiber optic cable is to be transferred to a second fiber optic cable while a channel being added to the first fiber optic cable are transferred from the second fiber optic cable. Various devices have been developed for transferring wavelength channels between two optical fiber cables.

One device is taught by Bilodeau et al., in "An all-fiber dense wavelength division multiplexer/demultiplexer using photoimprinted Bragg gratings" IEEE Photonics Technology Letters, Vol. 7, No. 4, pp. 388–390, which provides an all-fiber Mach-Zehnder interferometer with identical Bragg gratings in each of a pair of interferometer arms formed between two identical fused coupler regions. However, due to the interferometric nature of the device, the location of each component, i.e. the couplers, the fiber Bragg gratings, and the interfering arms needs to be controlled to a high degree of accuracy, thereby impeding its high-volume production.

A grating-frustrated coupler is disclosed by Arhambault et al. in Optics Letters Vol. 19 No. 3 Feb. 1, 1994, pp. 180–182, in which two single mode fibers form a 2×2 directional coupler. The two fiber cores are identical, except that only one of the cores contains a photorefractive Bragg grating coextensive with the coupling region. The grating frustrates the transfer of optical power from one fiber to the other within a narrow wavelength range. This approach also uses polished couplers which are difficult and expensive to fabricate. Additionally, the environmental stability of polished couplers tends to be lower than that of other approaches such as the fused taper method.

A grating-assisted coupler as disclosed by Dong et al. in IEEE Photonics Technology Letters, Vol. 8 No. 12, December 1996 includes a grating written in one fiber core over the coupling region of a polished 1000% coupler. The dropped channel sees a mismatched coupler due to the existence of the fiber Bragg grating and is therefore not coupled. Again, the environmental stability of polished couplers tends to be lower than that of other approaches such as the fused taper method.

U.S. Pat. No. 5,703,976 to Cullen discloses a wavelength selective 2×2 single mode fiber coupler having a weakly coupled coupling region in which the cladding modes of the two fibers are optically coupled while the core modes remain uncoupled. A matched pair of core-cladding mode converters are located on each fiber to opposite sides of the cladding region. This technique, however uses optical notch filters or bending to achieve conversion between the core and cladding modes. The forward propagating core mode is coupled to a forward propagating cladding mode and vice versa. Coupling from one forward propagating mode to another forward propagating mode requires a mode converter with a large period. Hence, in order to provide efficient coupling, these gratings must be relatively long. Furthermore, the notch filter and bending approaches are relatively difficult to control, particularly for narrow band devices.

It is therefore desirable to provide an add/drop filter for an optical fiber which may be more easily and reliably fabricated and without the need for both precisely positioning the components with respect to each other and for phase matching the components.

SUMMARY OF THE INVENTION

In view of the prior art, the present invention provides an optical fiber add/drop filter which includes a first and second elongate photosensitive optical fiber. Each optical fiber has opposed first and second ends and includes a core and a cladding. The cladding of the first optical fiber is optically coupled to the cladding of the second optical fiber at a coupler. A first fiber Bragg grating is etched into a second end of the first fiber for converting light propagating in a first direction through either of the core of cladding of the first fiber into light propagating in an opposite direction through the other of said core and cladding of said second fiber. A second fiber Bragg grating is etched into a first end of the second fiber for converting light propagating in a first direction either of the core or cladding of the second fiber into light propagating in an opposite direction through the other of the core and cladding of the second fiber. The first and second fiber Bragg gratings are located to opposite sides of the coupler.

The cladding mode coupler is fabricated so that there is substantially no coupling for the core modes of the coupler while the coupling ratio for the cladding is substantially 100 percent. The coupler may be fabricated by known methods including, but not limited to, the fuse taper method, the polished block method, or the fused polished method. However, the fibers may also be selected to have different propagation constants so the that the maximum coupling ratio of the coupler is about 50 percent and the coupling ratio is substantially constant over the entire wavelength range of interest. The advantage of the present invention is that the add/drop function is achieved without the need to phase match the constituent components.

The fiber Bragg gratings are written on the input and output ports of the coupler, on different fibers, at locations substantially outside the coupling region of the two fibers. The present invention avoids the need to control the position of the gratings relative to each other or with respect to the coupler and thereby simplifies and stabilizes the device. The fiber Bragg gratings function as wavelength selective mode converters. All incidental optical power at non-resonant wavelengths will pass substantially unaffected through the grating. Optical power at resonant wavelengths will couple between the core and cladding modes. In the The add/drop filter of the present invention may be cascaded to form an optical add/drop multiplexer. As the present invention is not an interferometer, the position of the gratings relative to one another is not critical. The length of the interaction region between the two couplers is also not critical.

DETAILED DESCRIPTION OF THE INVENTION

Figure 1:
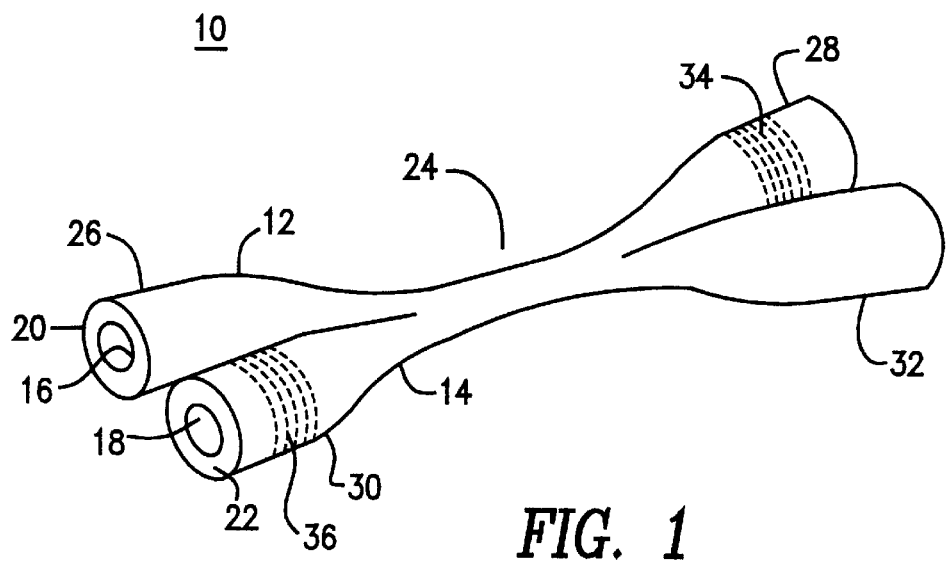
FIG. 1 shows a drop filter of the present invention.

Referring to FIG. 1, the present invention provides a drop filter 10 having a first optical fiber 12 and a second optical fiber 14. Fibers 12 and 14 are photosensitive optical fibers including a core 16 and 18, and a cladding 20 and 22, respectively. The photosensitivity of fibers 12 and 14 may be achieved using methods well-known in the art including, by way of illustration and not by limitation, by using an appropriately doped fiber. Alternatively, the photosensitivity of fibers 12 and 14 may be achieved by sensitizing a photo-insensitive fiber by flame brushing or by hydrogen loading, or a combination of these techniques. Desirably, both the cores 16 and 18 and the claddings 20 and 22 of fibers 12 and 14 are photo-sensitive.

Drop filter 10 includes a cladding mode coupler 24 in which the claddings 20 and 22 of fibers 12 and 14 are optically coupled while core s 16 and 18 of fibers 12 and 14 remain substantially uncoupled. Fiber 12 provides an input port 26 and a throughport 28 to either side of coupler 24. Fiber 14 provides a pass port 30 and a drop port 32 to either side of coupler 24 such that drop port 32 is opposite coupler 24 from input port 26. Furthermore, a first fiber Bragg grating 34 is written into throughport 28 outside coupler 24 at one or both of core 16 and cladding 20. Similarly, a second fiber Bragg grating 36 is written into pass port 30 outside coupler 24 at one or both of core 18 and cladding 22.

Fibers 12 and 14 may be selected to have substantially identical propagation constants so that coupler 24 may be fabricated to provide substantially no coupling of the cores 16 and 18 while providing substantially 100 percent coupling of claddings 20 and 22. Coupler 24 may be fabricated using any technique known to the art including, for purposes of illustration and not for limitation, the fuse taper method, the polished block method, or the fused polished method. For example, coupler 24 may be fabricated by holding fibers 12 and 14 substantially parallel over about 20 millimeters and then heating and drawing fibers 12 and 14. Additionally, one or both of fibers 12 and 14 may be etched prior to tapering so as to reduce the amount of tapering that is necessary to fabricate coupler 24. It is further contemplated by the present invention that fibers 12 and 14 may be D-shaped. The fibers need not be fused together as in the case of a polished block coupler, however if the fibers are fused together the D-shaped fibers reduce the amount of tapering that is necessary to form a suitable coupler 24. While not illustrated, it is also contemplated by the present invention that coupler 24 may be formed by more than two fibers, such as a 1×3 coupler where one or more of the fibers is photo-sensitive and the remaining fibers are photo-insensitive.

Fiber Bragg gratings 34 and 36 may be written into fibers 12 and 14 using well-known techniques including, by way of illustration and not of limitation, bathing the fiber with ultraviolet light. The ultraviolet light is modulated using phase masks, interference holograms or interfering laser beams. In order to facilitate the fabrication of coupler 24 with 100 percent coupling for claddings 20 and 22, fiber Bragg gratings 34 and 36 may be written prior to fabricating coupler 24. Fiber Bragg gratings 34 and 36 function as wavelength selective mode converters whereby all incident optical power at non-resonant wavelengths pass substantially unaffected therethrough. The present invention avoids the need to control the position of the gratings relative to each other or with respect to coupler 24 to thereby simplify the manufacture of and to stabilize the device. Furthermore, there is no need to phase match the constituent components of the present invention.

It is also contemplated by the present invention to form fiber Bragg gratings 34 and 36 to be temperature-compensating by attaching gratings 34 and 36, under tension, to a substrate with a negative thermal expansion coefficient. A rise in the temperature of the grating would normally cause a shift in the resonant wavelength which the grating would extract or add. However, by providing a tension bias, the same rise in temperature would also cause a counter-acting shift in the resonant wavelength so as to maintain the extraction or addition of the desired channel.

Channels of optical power at the resonant wavelengths will couple between the respective core and cladding modes at, and will desirably propagate in a direction opposite to which it encounters, gratings 34 and 36. That is, optical power in a forward propagating core mode through cores 16 or 18 will couple to a backward propagating cladding mode through claddings 20 or 22, respectively; and optical power in a forward propagating cladding mode through claddings 20 or 22 will couple to a backward propagating core mode through cores 16 or 18, respectively. Similarly, optical power in a backward propagating core mode through cores 16 or 18 will couple to a forward propagating cladding mode through claddings 20 or 22, respectively; and optical power in a backward propagating cladding mode through claddings 20 or 22 will couple to forward propagating core mode through cores 16 or 18, respectively.

Still referring to FIG. 1, the operation of drop filter 10 will now be explained. Optical power is launched through input port 26 of fiber 12 in a forward propagating core mode through coupler 24 and on to throughport 28 without coupling to fiber 14. Channels at non-resonant wavelengths propagated through throughport 28 are substantially unaffected by fiber Bragg grating 34. The channel at the selected resonant wavelengths is reflected by fiber Bragg grating 34 into cladding 20 in a backward propagating cladding mode towards coupler 24. This reflected channel couples at coupler 24 into cladding 22 in the backward propagating cladding mode towards fiber Bragg grating 36 at pass port 30. Fiber Bragg grating 36 again reflects the channel at resonant wavelengths but now into core 18 in a forward propagating core mode towards coupler 24. This dropped channel at the resonant wavelengths then exits through drop port 32. Hence filter 10 has successfully dropped the resonant wavelengths from fiber 12.

Figure 2:
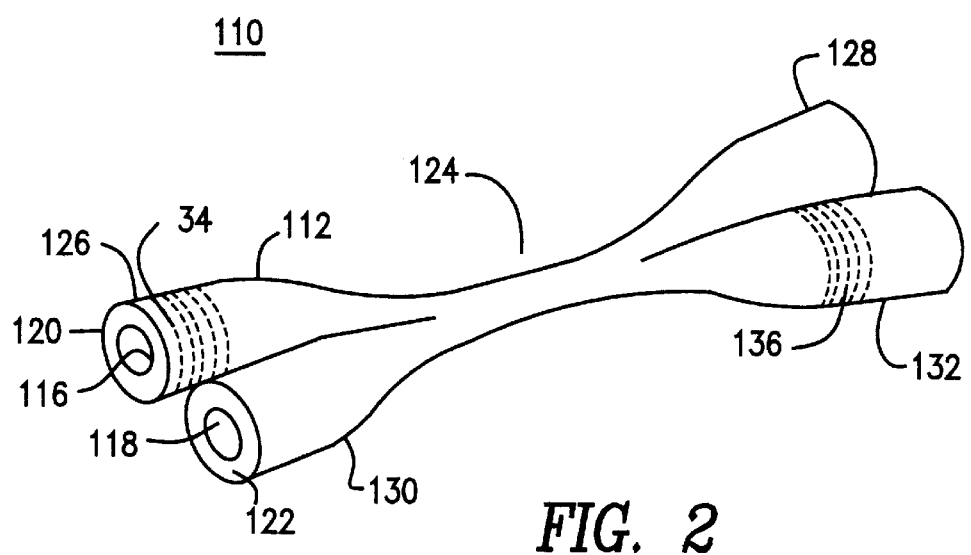
FIG. 2 shows an add filter of the present invention.

Referring now to FIG. 2, an add filter 110 of the present invention is depicted with like reference numerals representing like components. Add filter 110 includes a first optical fiber 112 and a second optical fiber 114. Fibers 112 and 114 are photosensitive optical fibers including a core 116 and 118, and a cladding 120 and 122, respectively. The photosensitivity of fibers 112 and 114 may be achieved using methods described hereinabove.

Add filter 110 includes a cladding mode coupler 124 in which the claddings 120 and 122 of fibers 112 and 114 are optically coupled while cores 116 and 118 of fibers 112 and 114 remain substantially uncoupled. Fiber 112 provides an input port 126 and a throughport 128 to either side of coupler 124. Fiber 114 provides an add port 130 and a pass port 132 to either side of coupler 124 such that add port 132 is opposite coupler 124 from throughport 128. Furthermore, a first fiber Bragg grating 134 is written into input port 126 outside coupler 124 on one or both of the core 116 and cladding 120. Similarly, a second fiber Bragg grating 136 is written into pass port 132 outside coupler 124 on one or both of core 118 and cladding 122.

Still referring to FIG. 2, the operation of add filter 110 will be explained. A transmission signal, lacking the channel of resonant wavelengths to be added, is launched through input port 126 of fiber 112 in a forward propagating core mode through coupler 124 to throughport 128. A secondary optical signal, including a channel of the resonant wavelengths desired to be added to the transmission signal, is launched through add port 130 of fiber 114 in a forward propagating core mode through coupler 124 towards pass port 132. The non-resonant wavelengths portion of the secondary optical signal exit through pass port 132 substantially unaffected by fiber Bragg grating 136. The resonant wavelengths of the secondary signal are reflected by fiber Bragg grating 136 into cladding 122 in a backward propagating cladding mode towards coupler 124. The resonant wavelengths of the secondary signal couple at coupler 124 into cladding 120 towards fiber Bragg grating 134 at input port 126. Fiber Bragg grating 134 then reflects the resonant wavelengths towards coupler 124 in a forward propagating core mode in core 116. The added resonant wavelengths then propagate through throughport 128 with the transmission signal. Hence add filter 110 has successfully added the resonant wavelengths from fiber 114 into fiber 112.

Figure 3:
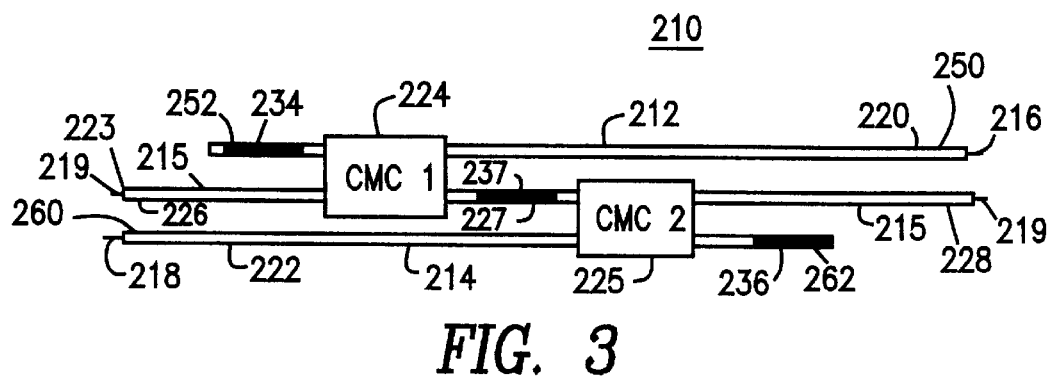
FIG. 3 shows an add/drop multiplexer formed in accordance with the present invention.

Referring now to FIG. 3, an add/drop multiplexer 210 of the present invention may be formed by cascading drop filter 10 with add filter 110. Functionally, add/drop multiplexer 210 may be formed by coupling throughport 28 of filter 10 to input port 126 of add filter 110. It is generally desirable that the resonant wavelengths which the drop filter 10 portion of multiplexer 210 extracts from the transmission signal are the same resonant wavelengths that the add filter 110 portion of multiplexer would add to the transmission signal. It is, however, certainly contemplated by the present invention that a drop filter 10 and an add filter 110 of the present invention may be combined so as to extract a channel of one particular set of wavelengths from, and to add a channel of a second and different set of wavelengths to, a transmission signal.

Multiplexer 210 includes a first optical fiber 212, a second optical fiber, 214, and a third optical fiber 215. Fibers 212, 214, and 215 are photosensitive optical fibers including a core 216, 218, and 219, and a cladding 220, 222, and 223, respectively. The photosensitivity of fibers 212, 214, and 215 may be achieved using the methods hereinabove described.

Multiplexer 210 includes a first cladding mode coupler 224 and a second cladding mode coupler 225. Coupler 224 optically couples the claddings 220 and 223 of fibers 212 and 215 while cores 216 and 219 are substantially uncoupled. Coupler 225 optically couples the claddings 222 and 223 of fibers 214 and 215 while cores 218 and 219 are substantially uncoupled. Coupler 224 is located between input port 226 and medial port 227 while coupler 225 is located between medial port 227 and throughport 228. Fiber 215 provides an input port 226, a through port 228 and a median port 227. Fiber 212 provides a drop port 250 and a first pass port 252 to either side of coupler 224 so that first pass port 252 is located opposite coupler 224 from medial port 227. Fiber 214 provides an add port 260 and a second pass port 262 to either side of coupler 225 so that second pass port 262 is located opposite coupler 225 from medial port 227.

A first fiber Bragg grating 234 is written into first pass port 252, a second fiber Bragg grating 236 is written into second pass port 262, and a third fiber Bragg grating 237 is written into medial port 227. Each fiber Bragg grating 234,236, and 237 may be written as hereinabove described. Furthermore, third fiber Bragg grating 237 may be provided by the serial array of fiber Bragg grating 34 of drop filter 10 with fiber Bragg grating 134 of add filter 110.

The operation of multiplexer 210 will now be explained. A transmission signal is launched into input port 226 through core 219 of fiber 215 in a forward propagating core mode towards throughport 228. The optical power that at the channel of resonant wavelengths is reflected by fiber Bragg grating 237 in a backward propagating cladding mode in cladding 223 towards coupler 224. At coupler 224 this resonant channel couples to cladding 220 in a backward propagating cladding mode towards fiber Bragg grating 234 at first pass port 252. The resonant channel then is reflected by fiber Bragg grating 234 towards coupler 224 in a forward propagating core mode in core 216 and then exits through drop port 250. A secondary optical signal is launched into core 218 at add port 260 in a forward propagating core mode through coupler 225 towards second pass port 262. The optical power of the secondary optical signal that is of the resonant channel of wavelengths is reflected by fiber Bragg grating 236 towards coupler 225 in backward propagating cladding mode in cladding 222. At coupler 225 the resonant channel couples to cladding 223 of fiber 215 towards fiber Bragg grating 237 at medial port 227 in a backward propagating cladding mode. The resonant channel is then reflected at fiber Bragg grating 237 towards coupler 225 in a forward propagating core mode so as to exit at throughport 228 with the transmission signal. Multiplexer 210 may thereby add or drop a resonant channel to or from a transmission signal. Furthermore, multiplexer 210 also ensures that a particular sub-signal carried by the resonant channel has been cleared from a transmission signal so that the addition of a second sub-signal carried on the same channel which is thereafter-added will not be corrupted.

Figure 4:
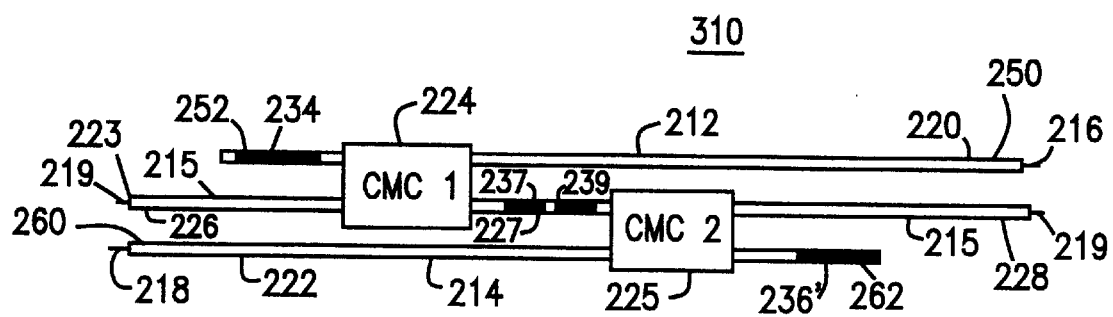
FIG. 4 shows an alternate embodiment of an add/drop multiplexer formed by cascading the add and drop filters of FIGS. 1 and 2.

FIG. 4 depicts an additional add/drop multiplexer 310 of the present invention. Add/drop multiplexer 310 is similar to add/drop multiplexer 210 except that fiber Bragg grating 236 has been replaced with fiber Bragg grating 236' and an additional matched fiber Bragg grating 239 is positioned on the core or cladding of fiber 215 at a location between fiber Bragg grating 237 and coupler 225. Fiber Bragg gratings 236' and 239 may be selected to add a different channel, or resonant wavelength, of light than dropped through fiber Bragg gratings 234 and 237. Add/drop multiplexer 310 may alternatively be formed by cascading add filter 10 and drop filter 110 such that throughport 28 of drop filter 10 is joined to input port 126 of add filter 110.

While the particular embodiment of the present invention has been shown and described, it will be obvious to those skilled in the art that changes and modifications may be made without departing from the teachings of the invention. For example, it is also contemplated by the present invention that fiber Bragg gratings 34 and 36 may convert between a forward or backward propagating core mode and a forward or backward propagating cladding mode, respectively. For example the drop filter 10 would instead provide the fiber Bragg gratings 34 and 36 written on the input port 26 and drop port 32 and the add filter 110 would provide the fiber Bragg gratings 134 and 136 written on the throughport 128 and the pass port 130. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. An optical fiber add/drop filter comprising:

first and second elongate photosensitive optical fiber, each said first and second optical fiber having opposed first and second ends and including a core and a cladding;

a coupler wherein said cladding of said first optical fiber is optically coupled to said cladding of said second optical fiber;

a first fiber Bragg grating etched into said second end of said first fiber for converting light propagating in a first direction through one of said core and cladding of said first fiber into light propagating in a second direction opposite to said first direction through the other of said core and cladding of said second fiber; and a second fiber Bragg grating etched into said first end of said second fiber for converting light propagating in a first direction through one of said core and cladding of said second fiber into light propagating in a second direction opposite to said first direction through the other of said core and cladding of said second fiber, said first and second fiber Bragg gratings located to opposite sides of said coupler.

2. The optical fiber add/drop filter of claim 1, wherein said first fiber Bragg grating is etched into one of said core and cladding of said first fiber.

3. The optical fiber add/drop filter of claim 1, wherein said second fiber Bragg grating is etched into one of said core and cladding of said second fiber.

4. The optical fiber add/drop filter of claim 1, wherein said core modes of said first and second fiber are substantially uncoupled.

5. The optical fiber add/drop filter of claim 1, wherein said first and second fibers exhibit substantially identical propagation constants to enhance cladding mode coupling while limiting core mode coupling.

6. The optical fiber add/drop filter of claim 1, wherein said first and second fibers have a tapering shape at said coupler.

7. The optical fiber add/drop filter of claim 1, wherein said first and second fibers have a D-shaped cross-sections.

8. The optical fiber add/drop filter of claim 1, wherein said first Fiber Bragg grating is attached to a substrate having a negative thermal expansion coefficient.

9. The optical fiber add/drop filter of claim 1, wherein said first end of said first fiber comprises an input port, said second end of said first fiber comprises a throughport, and said second end of said second fiber comprises a drop port such that light launched through said input port at a resonant wavelength to said first and second fiber Bragg gratings will be dropped from said light launched through said input port and propagating through said throughport, said light at a resonant wavelength to said first and second fiber Bragg grating propagating through said drop port.

10. The optical fiber add/drop filter of claim 1, wherein said second end of said first fiber comprises an input port, said first end of said first fiber comprises a throughport, and said first end of said second fiber comprises an add port such that light launched through said add port at a resonant wavelength to said first and second fiber Bragg gratings will be added to light launched through said input port propagating through said throughport.

11. An optical fiber add/drop multiplexer comprising:

a first, second, and third elongate photosensitive optical fiber, each said first and second optical fiber having opposed first and second ends and including a core and a cladding;

a first coupler wherein said cladding of said first optical fiber is optically coupled to said cladding of said second optical fiber;

a second coupler wherein said cladding of said second optical fiber is optically coupled to said cladding of said third optical fiber;

a first fiber Bragg grating etched into a first end of said first fiber for converting light propagating in a first direction through one of said core and cladding of said first fiber into light propagating in a second direction opposite to said first direction through the other of said core and cladding of said second fiber;

a second fiber Bragg grating etched into said second fiber at a location between said first and second couplers for converting light propagating in a first direction through one of said core and cladding of said second fiber into light propagating in a second direction opposite to said first direction through the other of said core and cladding of said second fiber; and a third fiber Bragg grating etched into said second end of said third fiber for converting light propagating in a first direction through one of said core and cladding of said third fiber into light propagating in a second direction opposite to said first direction through the other of said core and cladding of said third fiber, wherein said first and third fiber Bragg gratings are located to opposite sides of said first and second coupler, respectively, as said second fiber Bragg grating.

12. The optical fiber add/drop filter of claim 11, wherein said first fiber Bragg grating is etched into one of said core and cladding of said first fiber.

13. The optical fiber add/drop filter of claim 11, wherein said second fiber Bragg grating is etched into one of said core and cladding of said second fiber and said third fiber Bragg grating is etched into one of said core and cladding of said third fiber.

14. The optical fiber add/drop filter of claim 11, wherein said first, second, and third fibers exhibit substantially identical propagation constants to enhance cladding mode coupling while limiting core mode coupling.

15. The optical fiber add/drop filter of claim 11, wherein said first and second fibers have a tapering shape at said first coupler.

16. The optical fiber add/drop filter of claim 11, wherein said first and second fibers have a D-shaped cross-sections.

17. The optical fiber add/drop filter of claim 11, wherein at least one of said first, second, and third Fiber Bragg gratings is attached to a substrate having a negative thermal expansion coefficient.

18. The optical fiber add/drop filter of claim 11, wherein said first end of said second fiber comprises an input port, said second end of said second fiber comprises a throughport, said second end of said first fiber comprises a drop port such that light launched through said input port at a resonant wavelength to said first and second fiber Bragg gratings will be dropped from said light launched through said input port and propagating through said throughport, said light at a resonant wavelength to said first and second fiber Bragg grating propagating through said drop port; and wherein said first end of said third fiber comprises an add port, such that light launched through said add port at a resonant wavelength to said second and third fiber Bragg gratings will be added to light launched through said input port propagating through said throughport.

19. The optical fiber add/drop filter of claim 18, further comprising a fourth fiber Bragg grating etched onto said second fiber between said second fiber grating and said second coupler, said first and second fiber Bragg grating having similar resonant wavelengths for reverse propagation of light between the core cladding of the respective fibers, said third and fourth fiber Bragg gratings having similar resonant wavelengths for reverse propagation of light between the core and cladding of the respective fibers.

* * * * *